(12) United States Patent
Jacobson

(10) Patent No.: US 7,442,303 B2
(45) Date of Patent: Oct. 28, 2008

(54) MICROPOROUS FILTER MEMBRANE, METHOD OF MAKING MICROPOROUS FILTER MEMBRANE AND SEPARATOR EMPLOYING MICROPOROUS FILTER MEMBRANES

(75) Inventor: James D. Jacobson, Lindenhurst, IL (US)

(73) Assignee: Baxter International Inc., Deerfield, IL (US)

( * ) Notice: Subject to any disclaimer, the term of this patent is extended or adjusted under 35 U.S.C. 154(b) by 458 days.

(21) Appl. No.: 11/195,025

(22) Filed: Aug. 2, 2005

(65) Prior Publication Data

US 2005/0263452 A1 Dec. 1, 2005

Related U.S. Application Data

(62) Division of application No. 09/457,173, filed on Dec. 8, 1999, now abandoned.

(51) Int. Cl.
*B01D 71/00* (2006.01)
*B01D 71/26* (2006.01)
*B29C 35/08* (2006.01)
*B44C 1/22* (2006.01)
*B31D 3/00* (2006.01)
*B29C 35/00* (2006.01)

(52) U.S. Cl. .............................. 210/510.1; 210/500.22; 210/500.36; 96/8; 96/12; 55/522; 55/529; 55/DIG. 5; 264/42; 264/299; 264/400; 264/494; 264/225; 264/219; 216/2; 216/41; 216/56

(58) Field of Classification Search ................. None
See application file for complete search history.

(56) References Cited

U.S. PATENT DOCUMENTS

| 3,648,692 A | 3/1972 | Wheeler |
| 4,340,479 A | 7/1982 | Pall |
| 4,579,698 A | 4/1986 | Meyering et al. |
| 4,604,208 A | 8/1986 | Chu et al. |
| 4,797,175 A | 1/1989 | Ellion et al. |
| 4,797,211 A | 1/1989 | Ehrfeld et al. |

(Continued)

FOREIGN PATENT DOCUMENTS

DE 4103853 A1 8/1992

(Continued)

OTHER PUBLICATIONS

Ehrfeld, et al., "Microfabrication of Membranes With Extreme Porosity and Uniform Pore Size", Journal of Membrane Science, 36 (1988).

(Continued)

*Primary Examiner*—Krishnan S Menon
(74) *Attorney, Agent, or Firm*—Stephen B. Heller; Bradford R. L. Price

(57) ABSTRACT

A filter membrane, methods of making such filter membrane and apparatus employing such filter membrane are disclosed, in which the filter membrane is a monolithic polymeric membrane that includes a polymeric filter layer including a micron-scale precision-shaped pores and a polymeric support layer that has a precision-shaped porous support structure for the filter layer. Several methods are disclosed for making such a membrane using micromachining techniques, including lithographic, laser ablation and x-ray treatment techniques. Several filter apparatus employing such a membrane are also disclosed.

23 Claims, 8 Drawing Sheets

U.S. PATENT DOCUMENTS

| | | | |
|---|---|---|---|
| 4,832,997 A | 5/1989 | Balanzat et al. |
| 4,844,778 A | 7/1989 | Witte |
| 4,872,888 A | 10/1989 | Ehrfeld et al. |
| 4,923,608 A | 5/1990 | Flottmann et al. |
| 5,194,145 A | 3/1993 | Schoendorfer |
| 5,234,538 A | 8/1993 | Luck |
| 5,256,360 A | 10/1993 | Li |
| 5,259,737 A | 11/1993 | Kamisuki et al. |
| 5,275,725 A | 1/1994 | Ishii et al. |
| 5,277,556 A | 1/1994 | Van Lintel |
| 5,348,788 A | 9/1994 | White |
| 5,427,663 A | 6/1995 | Austin et al. |
| 5,492,551 A | 2/1996 | Wolfe |
| 5,514,150 A | 5/1996 | Rostoker |
| 5,514,378 A | 5/1996 | Mikos et al. |
| 5,543,046 A | 8/1996 | Van Rijn |
| 5,651,900 A | 7/1997 | Keller et al. |
| 5,653,687 A | 8/1997 | Mills et al. |
| 5,681,568 A | 10/1997 | Goldin et al. |
| 5,705,070 A | 1/1998 | Saaski et al. |
| 5,709,798 A | 1/1998 | Adiletta |
| 5,711,960 A | 1/1998 | Shikinami |
| 5,714,160 A | 2/1998 | Magruder et al. |
| 5,728,089 A | 3/1998 | Lal et al. |
| 5,753,014 A | 5/1998 | Van Rijn |
| 5,770,076 A | 6/1998 | Chu et al. |
| 5,798,042 A | 8/1998 | Chu et al. |
| 5,807,406 A | 9/1998 | Brauker et al. |
| 5,824,204 A | 10/1998 | Jerman |
| 5,839,467 A | 11/1998 | Saaski et al. |
| 5,843,069 A | 12/1998 | Butler et al. |
| 5,849,208 A | 12/1998 | Hayes et al. |
| 5,855,801 A | 1/1999 | Lin et al. |
| 5,876,187 A | 3/1999 | Forster et al. |
| 5,876,452 A | 3/1999 | Athanasiou et al. |
| 5,919,364 A | 7/1999 | Lebouitz et al. |
| 5,922,210 A | 7/1999 | Brody et al. |
| 5,928,207 A | 7/1999 | Pisano et al. |
| 5,928,880 A | 7/1999 | Wilding et al. |
| 5,938,923 A | 8/1999 | Tu et al. |
| 5,985,164 A | 11/1999 | Chu et al. |
| 5,985,328 A | 11/1999 | Chu et al. |
| 5,997,263 A | 12/1999 | Van Lintel et al. |
| 6,044,981 A | 4/2000 | Chu et al. |
| 6,129,928 A | 10/2000 | Sarangapani et al. |
| 6,146,771 A | 11/2000 | Wirt et al. |
| 6,180,129 B1 | 1/2001 | Magruder et al. |
| 6,187,329 B1 | 2/2001 | Agrawal et al. |
| 6,227,809 B1 | 5/2001 | Forster et al. |
| 6,264,044 B1 | 7/2001 | Meyering et al. |
| 6,333,029 B1 | 12/2001 | Vyakarnam et al. |
| 6,344,061 B1 | 2/2002 | Leitao et al. |
| 6,491,819 B2 | 12/2002 | Prince et al. |
| 6,497,821 B1 | 12/2002 | Bellamy, Jr. et al. |
| 6,500,751 B2 | 12/2002 | Suprenant et al. |
| 6,520,997 B1 | 2/2003 | Pekkarinen et al. |
| 2004/0028875 A1 | 2/2004 | Van Rijn et al. |

FOREIGN PATENT DOCUMENTS

| | | |
|---|---|---|
| EP | 89/325752 | 8/1989 |
| EP | 0270441 B1 | 9/1991 |
| EP | 0317399 B1 | 4/1992 |
| EP | 1764146 A2 | 3/2007 |
| JP | 03-060713 A | 3/1991 |
| WO | WO 88/04184 | 6/1988 |
| WO | WO 95/13860 | 5/1995 |
| WO | WO 96/10966 | 4/1996 |
| WO | WO 98/13131 | 4/1998 |
| WO | WO 99/64580 | 12/1999 |
| WO | WO 00/05166 | 2/2000 |
| WO | WO 00/16833 | 3/2000 |
| WO | WO 01/41905 | 6/2001 |

OTHER PUBLICATIONS

Stemme, et al., "New Fluid Filter Structure in Silicon Fabricated Using a Self-Aligning Technique", Appl. Phys. Lett. 53 (16), Oct. 17, 1988.

Wilding, et al., "Manipulation and Flow of Biological Fluids in Straight Channels Micromachined in Silicon", Clinical Chemistry, vol. 40, No. 1, 1994.

"Microfabrication Technology for Research and Diagnostics", Brochure for Seminar by Cambridge Healthtech Institute, Sep. 28-29, 1995.

Van Rijn, et al., "Micro filtration Membrane Sieve with Silicon Micro Machining for Industrial and Biomedical Applications", Institute of Electrical and Electronics Engineers, 1995.

Internet Posting: from craum@marian.engg.uregina.ca Re: "Welcome to sci.engr.micromachining (FAQ)", Sep. 16, 1996.

Internet Posting: MSI Micron Separations Inc., www.msifilters.com/_msi_p24.htm, Oct. 22, 1996.

"Second Annual Microfabrication Technology for Biomedical Applications", Brochure for Seminar by Cambridge Healthtech Institute, Oct. 24-25, 1996.

Dejule, "Lithography News", Semiconductor International, Mar. 1997.

Madou, Fundamentals of Microfabrication, 1997.

Yang, et al, "Micromachined Membrane Particle Filters", MEMS 98 Workshop on Micro Electro Mechanical Systems, Jan. 25-29, 1998.

Hsiai, et al., "Micro Fluidic Separation by Membrane Filters", Microsystems Technology in Medicine and Biology Seminar, Apr. 15-16, 1998.

"Micromechanics Europe '98 Posters", Micromachine Devices, Oct. 26, 1998.

Internet Posting: "Aquamarijn Micro Filtration B.V.", from www.el.utwente.nl/mesa/aquamarijn/property.htm, C. van Rijn, et al., Oct. 27, 1998.

Internet Posting: "Introduction to Microengineering MEMS Micromachines MST", D. Banks, Apr. 26, 1999.

Nelson et al., "Microfabrication of Porous Polymide Membranes", 183rd meeting of The Electrochemical Society, Inc. (1993).

Beirne et al., "Microfabricated Polymide Membrane Test Structures", publication title and date unknown.

B Jo, et al., "Three-Dimensional Micro-Channel Fabrication in Polydimethylsiloxane (PDMS) Elastomer," Journal of Microelectromechanical Systems, Mar. 2000, pp. 76-78a, vol. 9, No. 1, IEEE.

Trautmann, et al., "Pore Geometry of Etched ION Tracks in Polymide", Nuclear Instruments & Methods in Pysics Research, Section—B: Beam Interactions With Materials and Atoms, vol. 111, No. 1, Apr. 1, 1996, North Holland Publ. Co., Amsterdam, NL.

Co-pending U.S. Appl. No. 60/169,714, filed Dec. 8, 1999, entitled, "Porous Three Dimensional Structure", Michael O. Pekkarinen and James Brauker, inventors.

Trautman et al., Pore Geometry of Etched Ion Tracks in Polymide, Nuclear Instruments and Methods in Physics Research, Section B—Beam Interactions with Materials and Atoms, 1996, pp. 70-74, vol. 111, North Holland Publishing Company, Amsterdam, NL.

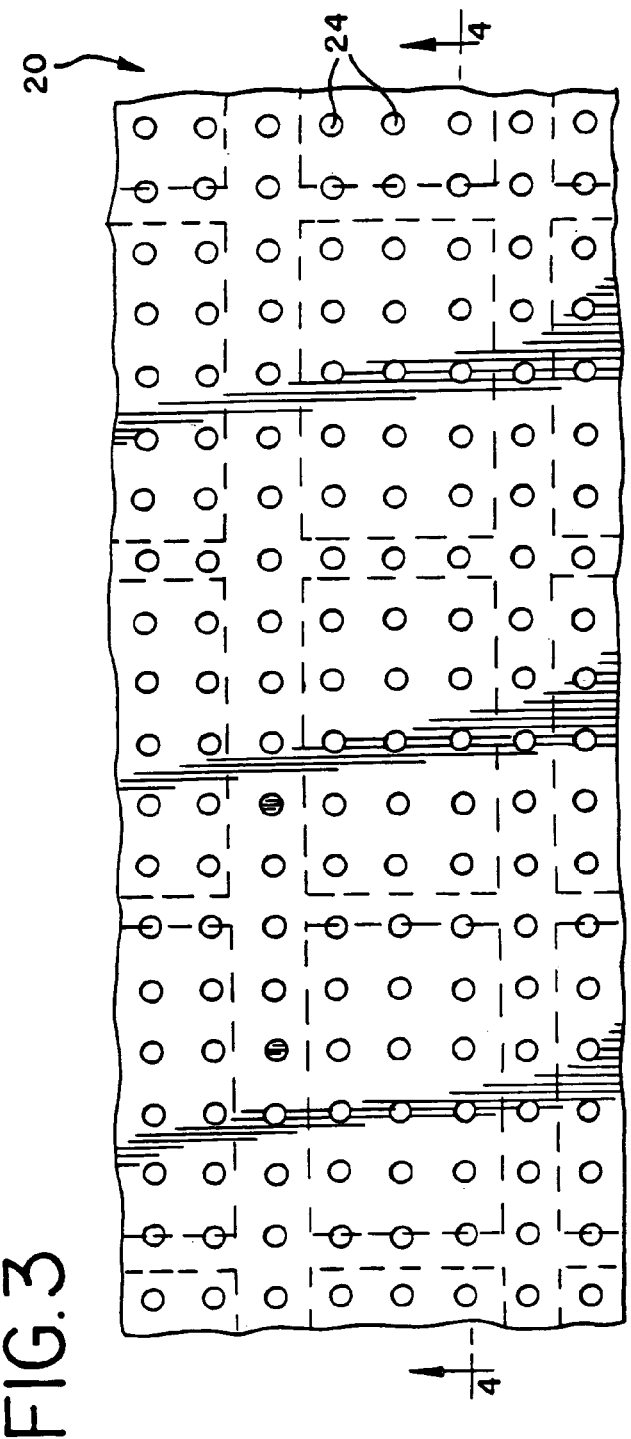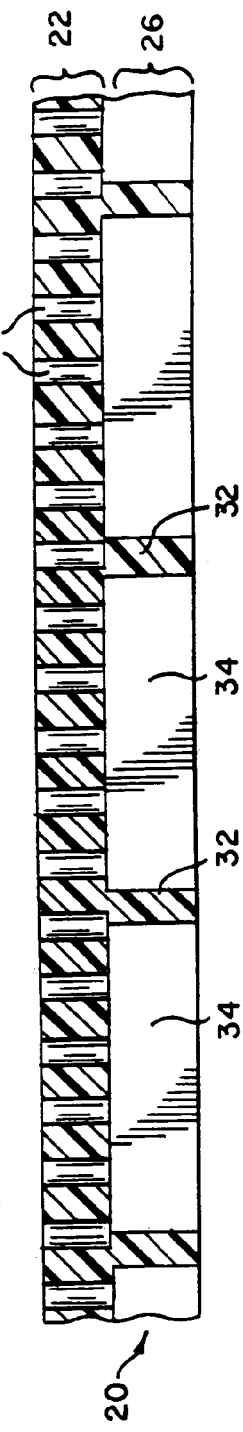
FIG.3
FIG.4

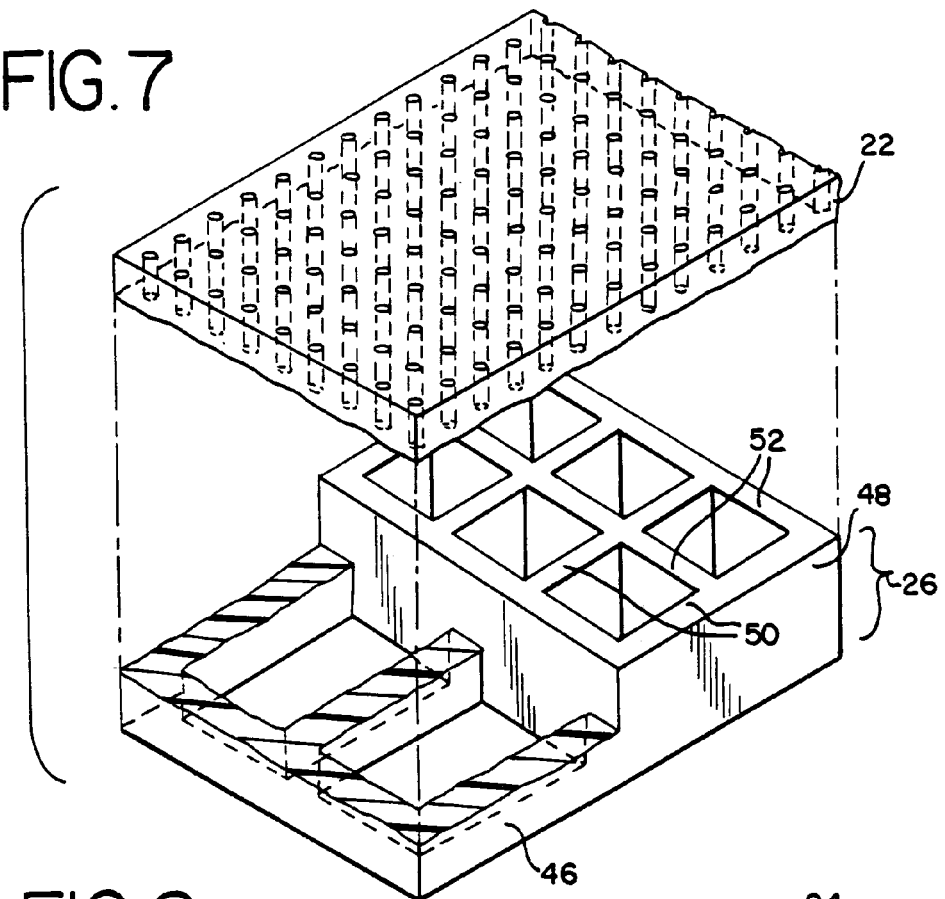
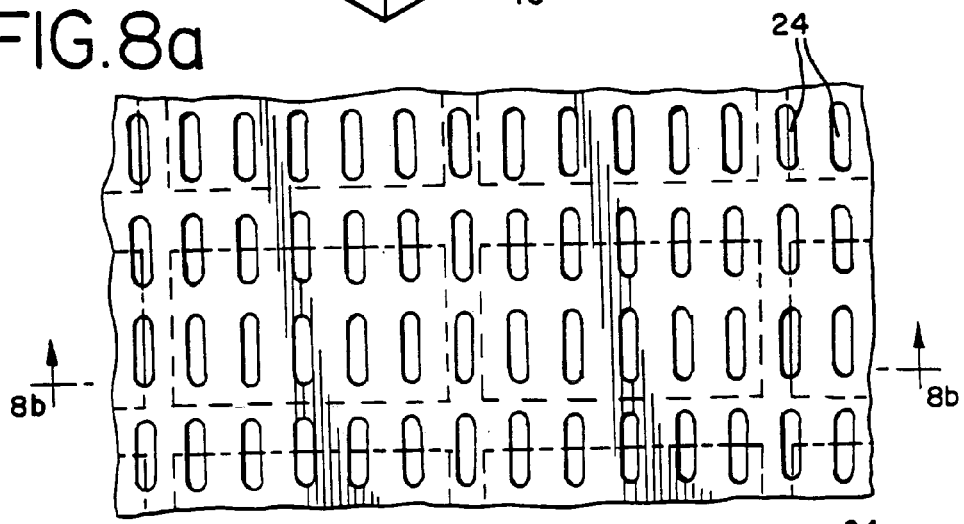
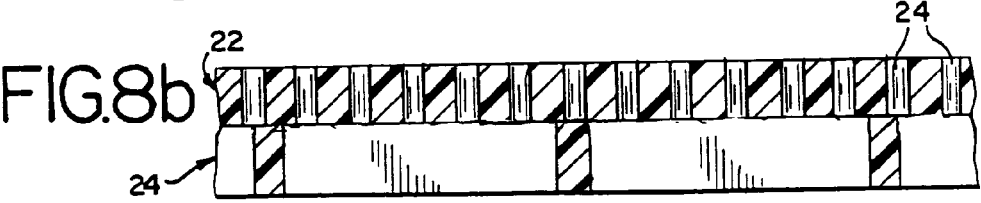

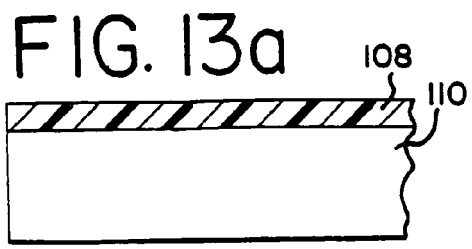
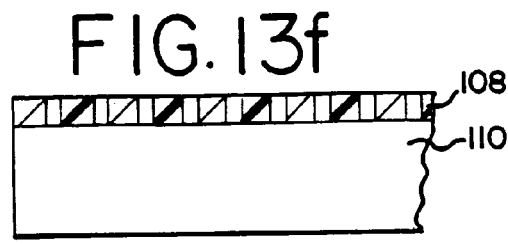
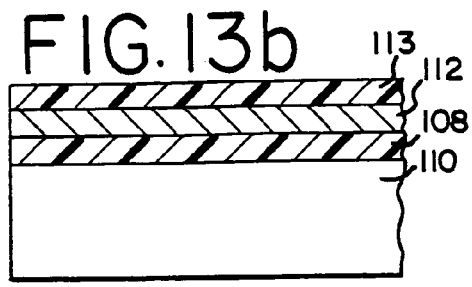
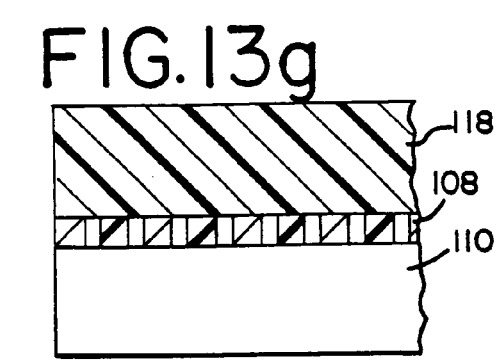
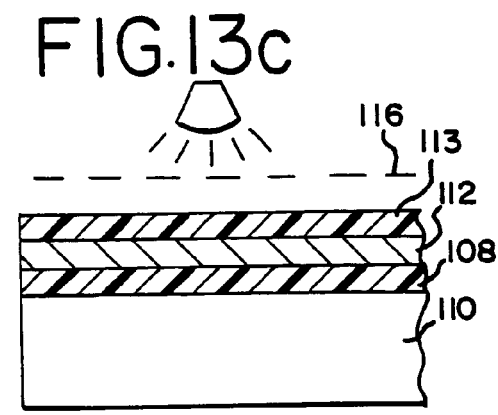
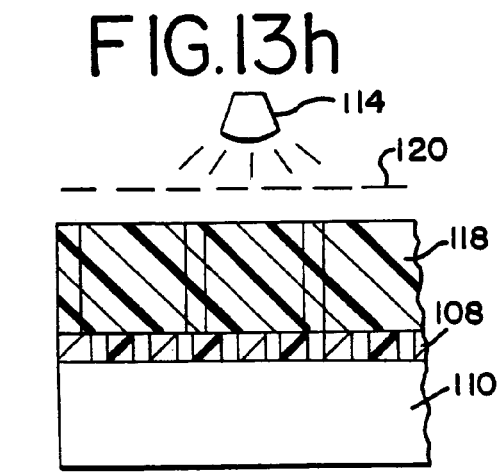
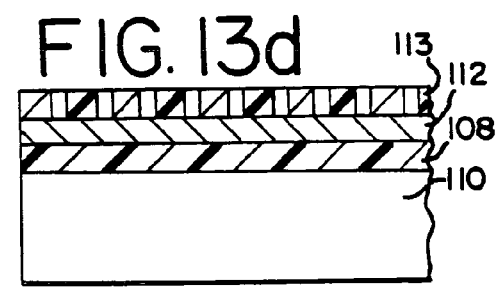
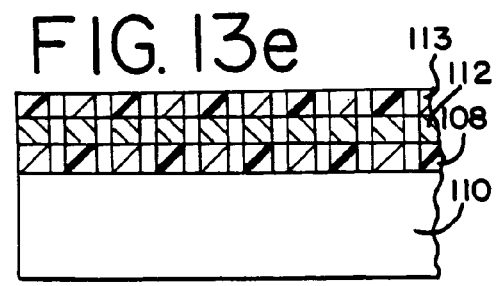
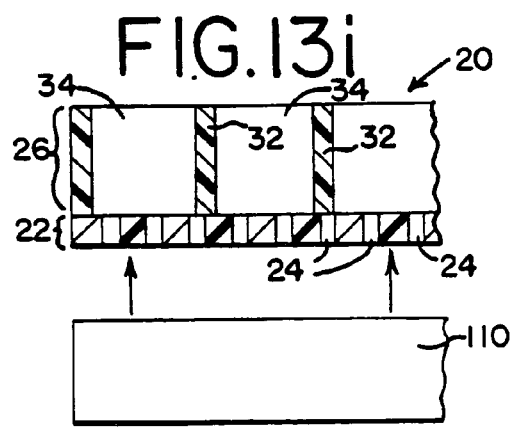

MICROPOROUS FILTER MEMBRANE, METHOD OF MAKING MICROPOROUS FILTER MEMBRANE AND SEPARATOR EMPLOYING MICROPOROUS FILTER MEMBRANES

CROSS-REFERENCE TO RELATED APPLICATIONS

This is a divisional of U.S. application Ser. No. 09/457,173, filed Dec. 8, 1999 now abandoned.

FIELD

The present invention relates generally to microporous membranes, to methods for making microporous membranes and to filtration or separation apparatus employing microporous membranes. More specifically, the present invention relates to microporous membranes of the type employing precisely dimensioned, micron-scale pores, and to methods for making such membranes and apparatus employing such membranes.

BACKGROUND

Filters that discriminate based on size and/or shape are well known. One type of filter, for example, provides a tortuous path through which particles must navigate to pass through the filter. These are sometimes referred to as depth filters, and typically use a filter element made of a thick bed of fiber or other material. Due to their thickness and tortuous path filtration technique, these filters sometimes require relatively high transmembrane, i.e. transfilter, pressures to facilitate flow through the filter, due to its thickness and the tortuous path filtration technique.

In contrast to depth filters, another well-known type of filter employs relatively thin filter membranes, which typically have nominal pore sizes. Such membranes have been used in a wide variety of medical and industrial applications. For example, such filter membranes, with nominal pore size as low as 0.22 microns, have been used to filter bacteria and other matter from liquids, such as intravenous solutions. Such microporous filters also have been used to separate the cellular components of human blood (red cells, white cells and platelets) from liquid plasma in which the components are suspended. One well known device for carrying out such separation of blood components is the Autopheresis-C® separator, which is sold by Baxter Healthcare Corporation of Deerfield, Ill.

Although nominal pore size filter membranes have functioned generally satisfactorily, they tend to have limited porosity, discriminate principally on the basis of size alone, and sometimes suffer from reduced flow rates due to blockage on the surface of the membrane. "Porosity," as used here, refers to the portion or percentage of the membrane surface made up of pores. This may also be referred to as the membrane "transparency." A high porosity or transparency filter membrane, i.e., one in which a large portion of its surface is made up of pores, tends to allow higher flow rates through the filter membrane at a given transmembrane pressure than a low porosity or transparency membrane, i.e., one in which a small portion of its surface is made up of pores.

More recently, efforts have been directed to developing filter membranes having precise pore sizes and shapes for increased discrimination, particularly at the micron and sub-micron scale for the separation of, for example, cells and cell components. Such filters may have particular, but not exclusive, application in the separation of blood cells or other types of cells from one another or from the liquid (plasma in the case of blood cells) in which they are suspended.

Filters with micron or smaller scale pores, however, often have significant limitations. One such filter membrane is referred to as a "trac-etched" membrane. A trac-etched membrane has holes or pores of uniform micron-scale diameter for discrimination based on particle size. However, trac-etched membranes typically have low porosity, which limits the amount of throughput or filtration rates.

With trac-etched filters, for example, porosity tends to be between approximately two and six or seven percent. Attempts to increase porosity in trac-etched filter membranes often results in doublets or triplets, which are holes that overlap and therefore reduce the discrimination of the filter membrane. To avoid doublets or triplets, porosity in trac-etched membranes is typically limited to about seven percent and less.

In addition to low porosity, trac-etched membranes have another drawback. Trac-etched membranes have only circular pores and are therefore not suitable for discriminating based on non-circular particle shape.

More recently, it has been suggested to use lithographic microfabrication or similar micromachining techniques to provide filter membranes in which the pores have precise size and shape. U.S. Pat. No. 5,651,900 for example, discloses a particle filter made of inorganic material, such as silicon, that is suitable for use in high temperatures and with harsh solvents. The filter has precisely controlled pore sizes formed by interconnecting members, and has optional reinforcing ribs.

Precise pore size filter membranes have also been proposed, for example, for separating one class of blood cells from another. U.S. patent application Ser. No. 719,472, entitled "Method and Apparatus for Filtering Suspensions of Medical and Biological Fluids or the Like", filed Sep. 25, 1996, and hereby incorporated by reference herein, describes such filter membranes having precise micron-scale and precision-shaped pores that can be used, for example, to separate red cells from white cells in human blood.

Experience has demonstrated, however, that the manufacture of microstructures, such as single-layer filter membranes by microlithography, micromachining or similar processes suffers from several constraints. As a "rule of thumb," for example, the diameter or largest transverse dimension of the pores can be no smaller than about ½ or ⅓ the thickness of the membrane itself. Therefore, very small pore sizes, such as one micron or less, require very thin membranes of 2 to 3 microns or smaller in thickness. The inverse of this is commonly known as the "aspect ratio" and generally means that the thickness can be no more than about 2 or 3 times the pore size. Such very thin membranes, however, are typically very fragile and may not be sufficiently robust for some of the well known uses of microporous filter membranes.

One such well known use is in the Autopheresis-C® plasmapheresis device sold by Baxter Healthcare Corporation of Deerfield Ill. A detailed description of Autopheresis-C® device may be found in U.S. Pat. No. 5,194,145 to Schoendorfer, incorporated by reference herein. The Autopheresis-C® separator employs a microporous membrane mounted on a spinning rotor within a stationary housing. As described in the above patent, such a device is particularly efficient at separating blood cells from the plasma in which they are suspended. However, the microporous membrane used in such a device must be flexible and able to withstand the high rotational speeds, shear forces, and transmembrane pressures encountered in such a separation system.

As a result, microfabrication of microporous filter membranes has, in the past, been limited by competing considerations. On the one hand, finer filtration (smaller pore size) typically requires a filter membrane that is increasingly thin, and thus increasingly fragile. On the other hand, the desire for membrane robustness has generally been met by thicker membranes that do not typically permit the formation of high porosity very small, precisely controlled pores.

As one answer to the issue of membrane fragility, it has been proposed to provide a filter membrane in which the membrane layer is located on a support layer. U.S. Pat. No. 5,753,014 to Van Rijn describes a composite membrane having a polymeric membrane layer atop a separate polymeric macroporous support. The perforations or pores in the membrane layer and in the support are made by a micromachining process, such as a lithographic process in combination with etching. An intermediate layer may be deposited between the membrane and support for bonding enhancement and stress reduction. Although such a membrane may be suitable for some applications, it remains a relatively expensive membrane to fabricate, using small volume processes.

Very thin microporous membranes of micron-scale pores are also found in non-filtration applications. For example, published International Application No. WO 96/10966, published Apr. 18, 1996, discloses a microfabricated structure for implantation in host tissue. The structure was made up of a series of polyimide polymer membrane layers, each having a different geometric pattern of holes formed by a microfabrication technique. As a result of stacking these membranes together, a porous three-dimensional structure is created that promotes the growth of vascular structures in a host.

In any event, there remains a need for new or improved microporous filter membranes, for new or improved methods and processes for making such filter membranes, and for apparatus employing such membranes.

SUMMARY OF INVENTION

Filter Membrane

In accordance with one aspect of the present invention, a monolithic polymeric filter membrane is provided that comprises a filter layer including micron-scale precision-shaped pores suitable for wide variety of filtration applications, and a support layer that includes a precision-shaped porous support structure for the filter layer. As discussed in more detail later, the filter membrane of the present invention may be fashioned from a single polymeric film or from multiple polymeric films that are joined, for example, by heat curing to form a single monolithic membrane with no discernible line of distinction between the filter and support layers. In either version, the present invention enables the filter layer to be very thin, which permits the formation of very small micron-scale precision-shaped pores, of relatively high porosity without resulting in undue membrane fragility.

In a preferred embodiment of the filter membrane of the present invention, the support layer is thicker than the filter layer, and may be thicker than the filter layer by a factor of between about 2 and 250. Also, the support layer is preferably, but not necessarily, co-extensive with the filter layer.

A wide variety of support structures may be employed in the present invention to support and reinforce the filter layer of the membrane. In accordance with this invention, the support structure is precision-shaped and, therefore, may be configured to suit the particular needs for a given application. In one disclosed embodiment, the support structure is made up of a plurality of spaced apart support struts to support the filter layer. The support struts are preferably spaced apart a distance substantially greater than the size of the pores, to allow the filtrate passing through the filter layer to pass through the support structure relatively unimpeded. For example, the struts may be spaced apart a distance in the range of about 50 to 1000 microns, although other spacings may be used without departing from the broader aspects of the present invention. A second plurality of spaced apart support struts may also be used, intersecting the first plurality of support struts to define a support grid supporting the filter layer. Although the strut grid is currently preferred, other support structures, such as post and beam, suspension webs, and others also can be used to support the filter layer.

In addition, the support structure also may comprise two or more layers or subgrids, for enhanced support and/or flexibility. The support layer, for example, may include one sublayer of selected porosity and another sublayer of different porosity between the filter layer and first-mentioned sublayer. The support layer may also include two or more subgrids of differing configuration. For example, in a support grid of the type employing spaced-apart struts, one subgrid could have struts of predetermined width and spacing and another subgrid could have struts of different width and/or spacing. As a further example, for supporting very thin filter layers, such as three microns or less, the subgrid directly supporting the filter layer could have more closely spaced struts that are not as wide as the struts in the other subgrid.

Thus, it should be clear that the number and configuration of sublayers or subgrids may be varied, depending on the particular needs of the filter membrane in a given application. For reduced stress and ease of manufacture, for example, a support layer comprising a grid of intersecting walls may employ curves instead of sharp angles at the intersections. Carried a further step, this support structure could, in fact, be defined by a plurality of spaced apart, generally elliptical or cylindrical pores that extend through the grid thickness and create support walls or webs with a narrow waist area and wide intersecting area.

The filter membrane of the present invention also may be made flexible. More particularly, the filter membrane of the present invention may be made sufficiently flexible to be disposed along a radius of curvature of about one-half inch, if desired. As will be described in greater detail later, this makes the filter membrane of present invention particularly suitable for application in rotating membrane separators, such as the earlier-mentioned Autopheresis-C® device, as well as other separators that require a non-planar, flexible filter membrane.

Although suitable for applications such as the Autopheresis-C® separator and other medical applications, the filter membrane of the present invention is also suitable for wide variety of other applications where microporous membranes are used to filter liquids or suspensions, such as water or wine filtration and other industrial applications. Typically, although not necessarily, the micron-scale pores of the filter layer will be less than or equal to about twenty microns in their largest transverse dimension, although the particular size may be varied depending on the application. "Micron-scale" in this description means less than about 100 microns. "Precision-shaped" means a generally specific and predetermined shape, in contrast to the nominal pore size membranes of the prior art. "Precision-shaped" is intended to include and allow for varying degrees of precision, provided the general shape of the pore or other structure is a predetermined non-random shape.

The exact pore size will depend on the desired application. For example, a filter membrane having pores less than or equal to about 0.22 microns in largest transverse (side-toside) dimension would be suitable for filtering bacteria, as well as other matter of similar size, from liquid. A filter membrane in which the pore size is less than or equal to about 0.60-0.65 microns would be suitable for removing most cells and cell fragments from blood, leaving essentially cell-free plasma or, in a very different application, for filtering wine. A pore size of 0.45 microns or less can remove e-coli bacteria or be used for diagnostic and microscopy applications. A pore size of 0.08 microns may be used to filter water for electronic fabrication processes.

The filter membrane of the present invention may also be made from a variety of materials and configurations that are suitable for microlithography or micromachining techniques. As noted above, the filter membrane of the present invention is monolithic, i.e., there is no reasonably discernible line of distinction between the layers or sublayers. Such a filter membrane may, for example, comprise layers made of materials that are different, but sufficiently compatible to be rendered monolithic by, for example, curing them together. Alternatively, a monolithic membrane results when the filter layer and support layer are defined on opposite sides of a single film.

The material of the filter layer and support layer is preferably photosensitive (or photoimageable) and etchable (by dry or wet processes), although materials suitable for laser ablation or suitable for radiation based processing may also be used. The filter and support layers may be, but are not necessarily, made from the same type of materials, provided they can be made monolithic. Material suitable for dry etching, for example, may be used to form the filter layer because of the particularly good definition that results from dry etching. The support layer, on the other hand, is typically coarser than the filter layer, and the degree of definition less demanding—allowing photoimageable or laser ablatable materials to be used. Although photoimaging and laser ablation procedures typically do not provide definition as good as dry etching, such procedures are suitable for forming the precision-shaped pores of the filter layer for most anticipated applications.

With laser ablation, each pulse of laser light removes only a small portion of polymeric material. Accordingly, laser ablation may be more suitable for forming the filter layer than the typically much thicker support layer. The support layer in such a membrane could be formed with other lithographic or micromachining processes, whether of single or multiple film construction.

On the other hand, synchrotrons deliver highly directional x-ray radiation that can be used to unbond or "unzip" the polymer backbone of acrylic material, such as polymethyl methacrylate (PMMA). Using this concept, exposed areas of a polymer membrane, as defined by an x-ray mask having absorbing and transmitting sections defining the desired pattern, may be "unzipped" by ionizing radiation and subsequently developed away by solvent bath. This process may be used to form the filter layer, support layer, or both.

As discussed in more detail later, the filter membrane may also be made from a film having the support layer embossed or pre-cast into one side, with the filter layer being formed using one or more of the above-described techniques for removing selected material from the other side of the film to define the filter layer.

It is also contemplated that the pores of the integral membrane of the present invention may be non-circular if desired, and non-circular may be preferred for certain applications. For example, the pores may be elongated, as disclosed in the pending U.S. application Ser. No. 719,472, to allow certain particles, such as red cells, to pass through and to block other particles, such as white cells. Depending on the application, other shapes may be desired, and the present invention lends itself particularly well to accommodating such varying needs.

As to materials for the filter and support layers, one preferred material for making the filter membrane is polyimide polymer. Polyimide polymers are available in photosensitive and etchable forms. A photosensitive polymer may be positive or negative. In negative-acting photosensitive polymers, the regions of the film that are exposed to light become fixed or permanent and the non-exposed regions of the film can be removed by chemical (solvent) treatment. In a positive-acting film, the portions of film exposed to light may be removed by chemical process, and the non-exposed regions remain fixed or permanent. The basic lithography and micromachining techniques for processing polymer membranes, such as polyimide photosensitive or etchable membranes, are well known, as shown for example in Published International Application WO 96/10966, incorporated by reference herein.

Separator

The filter membrane of the present invention may be employed in a separator for separating particles such as, but not limited to, cells from a liquid or suspension. For example, in accordance with this further aspect of the present invention, a separator may be provided comprising a housing including a fluid inlet and a first fluid outlet, with a flow path defined in the housing between the inlet and first outlet. A monolithic polymeric filter membrane of the present invention may be located within the housing in the flow path to filter fluid (filtrate) passing therethrough. As described above, such membrane includes a filter layer with micron-scale precision-shaped pores through which filtrate may pass, and a support layer including a porous support structure for the filter layer.

In such a separator, the filter membrane may be disposed in such a position and shaped as is reasonably needed for the particular application. For example, the filter membrane may be disposed across the flow path so as to filter particles, including but not limited to cells or cell fragments, from the liquid being filtered. Alternatively, the filter membrane may be positioned along the length of the flow path so that fluid from which filtrate is removed flows across the surface of the membrane. In this alternative, a second outlet would typically be provided to remove that portion of fluid not passing through the filter membrane.

Because of the flexible, robust character, the membrane of the present invention, in one of its preferred forms, may be positioned in the separator in a curved disposition and, in fact, the membrane may be curved along a radius of curvature of about one-half inch. These characteristics of the membrane of present invention make it particularly suitable for use in the type of device that separates a liquid or suspension by passing it between two relatively rotating structures. Such a device is exemplified by the Autopheresis-C® separator sold by Baxter Healthcare Corporation.

The Autopheresis-C® separator employs a generally cylindrical membrane-covered rotor within a generally cylindrical housing. A suspension, such as blood, is passed from one end of the housing to the other end, through a gap between the rotor and housing surfaces. Plasma flows through the membrane and exits through an outlet in the housing. As noted earlier, this has been found to be a very efficient device for separating the cellular components of human blood from the plasma in which they are suspended. It is, however, a relatively high stress environment in which the filter membrane must not only be flexible for mounting on the cylindrical rotor or housing, but have sufficient robustness to withstand the assembly or mounting of the membrane as well as the high-speed rotation of the rotor (several thousand rpm), the shear forces generated by the flowing fluid, and significant transmembrane pressure that may be employed to force filtrate to flow through the membrane (although with the high porosity, thin filter layer of the present invention, satisfactory filtrate flow rates may be obtained with lower transmembrane pressures than are presently used).

One of the very unique aspects of the Autopheresis-C® device is that the relative rotation between the rotor and housing creates a series of strong vortex cells in the gap— known as Taylor Vortices. The Taylor Vortices sweep the surface of the membrane, helping to keep the membrane surface free of occluding particles (cells) and taking advantage of the membrane porosity. The high porosity membrane of the present invention, with the micron-scale precision-shaped pores, holds substantial promise for improving the already excellent performance of the Autopheresis-C® device.

Therefore, in accordance with present invention, a separator may be provided for separating one or more components of liquid or suspension, which separator includes a housing defining a generally cylindrical interior surface and a rotor rotatably mounted within the housing and having a generally cylindrical outer surface spaced from the interior surface of the housing (or both). A flexible monolithic polymeric membrane in accordance with present invention may be disposed on the generally cylindrical surface of the rotor or on the generally cylindrical interior surface of the housing (or both). Such membrane includes a filter layer having micron-scale precision-shaped pores and a support layer including a precision-shaped porous support structure for the filter layer. Whether mounted on the rotor or housing, the filter layer of the membrane would be positioned to face the space between the rotor and housing. In other words, if the filter membrane were mounted on the rotor, the filter layer would be facing the interior housing surface, and vice versa. The housing includes an inlet for introducing liquid or suspension, such as blood, into the housing and an outlet for removing a portion of the suspension from the space between the rotor and housing. To remove filtrate passing through the membrane, an additional outlet in housing is provided to communicate with the porous support layer side of membrane.

In this rotary separator application, the filter membrane is curved to conform to the generally cylindrical surface of the rotor or housing on which it is disposed. This may require a radius of curvature as small as about one-half inch or thereabouts. As with the previously summarized separator, the size of the micron-scale pores of the filter membrane may be selected depending on the particular application or need.

It is understood that the filter membrane employed in the separators summarized above may include the more articular features and aspects summarized above with respect to the membrane without the need to repeat all of them here. For example, the separator of the present invention may include a monolithic filter membrane in which the filter layer and support layer are separate layers joined to form a monolithic membrane or formed from a single film or sheet. Additional support sublayers or subgrids may be employed to enhance flexibility and/or strength, or different pore sizes or geometries may be used depending on the application.

Method

A further aspect of the present invention is directed to the method(s) for making a filter membrane of the type embodying the present invention. As indicated earlier, the filter membrane of the present invention, comprising a monolithic filter layer including micron-scale precision-shaped pores and a support layer including a precision-shaped support structure, may be formed from a single polymeric film or from different films that are joined together to form a monolithic filter membrane. The monolithic polymeric filter membrane of the present invention may be fashioned from a single film by removing selected material from one side of the polymeric film to define the micron-scale precision-shaped pores of the filter layer. Separately or simultaneously, the support structure may be formed by removing selected material from the other side of the film to define the porous support structure for the filter layer, the pores communicating with the porous support structure to allow the passage of filtrate therethrough.

The filter membrane may be made monolithic by forming the filter and support layers from a single film or from separate films of the same or sufficiently compatible materials to allow the layers to become monolithic when bonded together. For example, the films may be non-fully cured when the pores and support structures are formed, and then cured together to form a monolithic membrane. When the filter membrane is made from two or more separate films, the filter layer is formed by removing selected material from one polymeric film to define a plurality of micron-scale precision-shaped pores through the membrane. The support layer is formed by removing selected material from another polymeric film to define a precision-shaped porous support structure. The filter and support layers, and any additional or intermediate layers that may be required, are placed in overlying and contacting relation, and the layers are joined together to form the monolithic filter membrane.

In accordance with another aspect of the present invention, the filter membrane may be formed from a single sheet of film in which the support structure is embossed or precast in one side of the sheet of film and one of the removal techniques discussed below used to remove selected material from the other side of the film to form the precision shaped pores.

A variety of techniques may be used for removing material from the polymeric film, and the present invention in its broadest respects is not limited to any particular technique or combination of techniques. Techniques generally considered suitable for forming micron-scale precision-shaped pores and precision-shaped support structures include the microlithography and micromachining techniques of photoimaging, wet and dry etching, radiation based processing, such as radiation "unzipping," and laser ablation. "Wet etching" generally refers to etching by contact with liquid elements and "dry etching" generally refers to etching by contact with gas or plasma. Other micromachining techniques already existing or later developed may also be used.

Although not all of these techniques have the same precision, they are all considered generally sufficiently precise for the present invention and for creating "precision shaped" pores and other structures. For example, laser light transmitted through a mask may be used to ablate the polymeric material of the film in selected areas defined by the mask. When the membrane is formed of a single film, laser ablation may be used to form either or both of the filter layer on one side of the film and the support layer on the other side of the film, simultaneously or sequentially.

With an etchable polymeric film, such as a film of polyimide material, a metallic film may be applied to one surface of the polyimide film, and then a photoresist layer is added to the metallic film. A first pattern is created on the photoresist layer by light focused through a mask having the desired design to define micron-scale pores or the support structures. Selected material of the photoresist layer, depending on the pattern of exposure, is then removed by known chemical processing techniques. The metallic film, in the areas revealed after the removal of photoresist material, is next removed in accordance with well-known techniques. The removal of the photoresist material and metallic film in the selected areas reveals areas of the polymeric film corresponding to the pattern first created on the photoresist layer. These areas of polymeric film may be removed by various processes, but dry etching, such as reactive ion etching, is one preferred technique because of better definition or pattern transfer. The metal layer protects selected areas of the film from the etching process. After the etching process, the remainder of the photoresist material and metallic film are then removed from the polyimide film, exposing the filter layer or support layer with the desired structure. This technique may be used to form one or both layers of a single film or one or both layers of a membrane made from multiple films. It may also be combined with other techniques, such as laser ablation, radiation based processing, or embossing such that one layer is formed by one technique and another layer formed by another technique. Because of its good definition, dry etching or radiation based processing may be preferred techniques for removing materials to form the filter layer.

Other techniques for forming the filter and support layers are also available with the present invention. The filter layer and/or support layer may comprise a photoimageable polymeric film and be formed by exposing the film to light through a mask that defines the pattern of the pores or support structure to be formed. Selected material of the film, depending on whether the film has positive or negative photoimageable properties, are then removed, as by solvent, to create the desired layer.

Of course, laser ablation and etching may also be used as desired to form the various layers, sublayers, grids, subgrids and other features of the membrane as desired, without departing from the broader aspects of this invention. As discussed above, highly directional synchrotron x-ray radiation may also be used to unbond or unzip the polymer backbone of certain polymeric materials, for example, through a mask, to define the desired pattern of pores (or support structure), with the exposed positions being developed away in a solvent bath.

In accordance with a further aspect of this invention, the filter membrane may be formed on a progressive, near continuous basis. In such a process, continuous web of polymeric film is continuously supplied. If photoimageable, a pattern is repeatedly, progressively created on the film by exposing one side to light through a mask. The film is then advanced through a solvent bath to remove selected material to form the filter or support layer. If the film is laser ablatable, laser light through a mask could be used to remove material in selected pattern from one or both sides of the film to form the filter and support layers. With photoimageable laser ablation or x-ray treatment methods, both layers of the filter and support can be formed simultaneously, or sequentially, on opposite sides of the membrane, with the result being a stepwise progressive, essentially continuous, manufacture of integral filter membrane of the present invention. Alternatively one side of the film could have an embossed or precast support structure, with one of the above techniques being employed to define the filter layer.

Another method for making an integral filter membrane of the present invention involves manufacture of the membrane atop a substrate such as quartz or, preferably, a silicon wafer. In this method, if the substrate is a silicon wafer, the filter membrane is made by spinning a first photoimageable polymide layer onto the silicon wafer. The first polyimide layer is exposed to light through a mask defining a first pattern of one of the micron-scale pores or support structure. A second polyimide layer is then spun onto the first layer of polyimide so as to create an interface therebetween. The second polyimide layer is exposed to light through a mask defining a second pattern of the other of the micron-scale pores or the support structure. Selected material is removed from the first and second polyimide layers to define the micron-scale pores and support structure, and the first and second polyimide layers are cured together so as to remove the interface therebetween and create a monolithic filter layer-support structure. The monolithic filter layer-support structure is then removed from the silicon wafer substrate. The step of removing of selected material from the first polyimide layer may be carried out before the second layer is spun onto the first layer or after the second layer is spun and exposed.

One more specific technique for making the filter membrane of the present invention on a silicon wafer substrate, in a batch type process, includes first spin coating polyimide material onto a substrate, such as a silicon wafer, after which a metal layer is applied, such as by sputtering, evaporation or vapor deposition, and a photoresist layer applied to the metal layer. The photoresist layer is developed by light exposure through a mask to define a first pattern of the micron-scale pores or the support structure. That pattern is transferred to the metal layer and subsequently transferred to the polyimide layer by selective removal of areas of the photoresist and metal layers to create the micron-scale pore pattern for the filter layer or the support structure pattern for the support layer. The photoresist and metal layer are then removed, and a second polyimide layer spin coated onto the first layer. A second pattern is created on the second polyimide layer to define the other of the micron-scale pore pattern or the support structure. Selected material, as defined by the first and second pattern, is removed to create the other of the pore pattern or support structure. To form the monolithic filter membrane, the first and second polyimide layers, which are not fully cured, are cured together to remove any interface therebetween and create the monolithic filter membrane, which is then removed from the silicon wafer or other substrate.

BRIEF DESCRIPTION OF DRAWINGS

FIG. 3 is a top view of the membrane filter of FIG. 1.

FIG. 4 is a sectional view of the filter membrane of FIG. 3, taken along line 4-4 of FIG. 3.

FIG. 7 is a perspective view of a membrane of the present invention in which the filter and support layers are separated to show a support layer of multiple sublayers or subgrids.

FIGS. 8(*a*) and (*b*) are top and cross-sectional views of an alterative membrane of the present invention in which the pores are generally elongated;

FIGS. 13a-13i illustrate steps of another method for making a membrane of the present invention.

DETAILED DESCRIPTION

Figure 1:
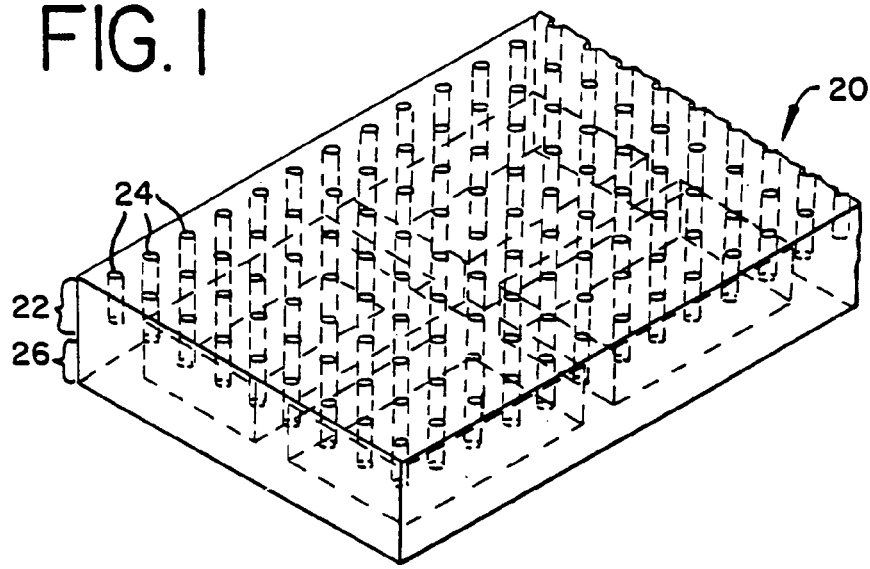
FIG. 1 is a perspective view of a microporous membrane filter embodying the present invention.

FIG. 1 depicts a microporous polymeric filter membrane, generally at 20, embodying the present invention. In accordance with the present invention, filter membrane 20 includes at least a filter layer 22 that includes a plurality of micron-scale precision-shaped pores 24, and a support layer 26 that includes a precision-shaped support structure (better seen in FIG. 2) for the filter layer, the filter and support layers being monolithic, in which there is no discernible line of distinction between the filter and support layers. As will be discussed in more detail later in connection with the method of making a membrane of the present invention, a monolithic membrane may be the result of forming the filter layer and support structure on opposite sides of a single film or forming the filter layer and support layer in different films that are either the same material or are different but sufficiently compatible material that they may be formed into a monolithic membrane, such as by forming the layers in an uncured or partially cured state and curing them together.

For purposes of illustration, the filter membrane 20 shown in FIG. 1 is not to scale. Although, theoretically, the support layer could be the same thickness as the filter layer, more typically the filter layer 22 will be substantially thinner than the support layer 26. Preferably, the support layer is thicker than the filter layer by a factor of between about two and two hundred fifty. More specifically, the filter layer of the filter membrane of the present invention may be between about 0.3 and 3-5 microns thick, and the total filter membrane, including both filter layer and the support layer, may be between about 6 and 75 microns thick. In accordance with the present invention, however, the thickness of both filter layer and the support layer may be varied, depending on the desired pore-size, the shape of pore, the degree of flexibility of the membrane that may be desired, as well as the amount of support desired for the filter layer.

One reason the filter layer is typically much thinner than the support layer is the general rule of thumb found in the manufacture of filter membranes by typical microfabrication techniques. As earlier mentioned, that rule of thumb is that the filter layer thickness, through which the pores extend, can be no greater than about 2 or 3 times the cross-sectional dimension of the pores. As noted earlier, this is called the "aspect ratio." For example, to form pores of 1 micron in cross-sectional dimension or diameter, the filter layer should be no thicker than about 2 or 3 microns.

For purpose of this description, "micron-scale" pores means a pore size of about 100 microns or less. "Pore size" generally refers to the cross-sectional dimension of the pore, and not the depth of the pore through the filter layer. For pores of circular cross-sectional shape, pore size generally refers to the diameter of pore and for pores that are not circular, such as elongated pores, "pore size" generally refers to the smallest cross-sectional dimension of the pores, unless otherwise stated.

It is presently contemplated that the pore size of a microporous filter membrane embodying present invention with typically be about 20 microns or less. The particular pore size may depend on the application to which the filter membrane is applied. For example, pore size of less than or equal to about 0.22 microns is smaller than bacteria and can remove bacteria from filtrate passing through the filter membrane. Pore size less than or equal to about 0.6-0.65 microns may be used in biomedical applications to remove cells from human blood or in industrial applications, for example, to filter wine. A pore size of about 0.45 microns or less may be used to remove e-coli bacteria or may find application in diagnostic applications. A pore size of 0.08 microns may provide ultra-filtrated water suitable for electronic fabrication processes. A pore size of about 2 microns would allow platelets and plasma of human blood to pass through, but would block red cells and white cells.

The density of the pores in the filter layer, or the "porosity" of the filter layer also may be selected accordingly to the intended application. In accordance with the present invention, the porosity of the filter layer may be substantially higher than found in earlier examples of micromachined filters, and the porosity may be as high as 30 percent or greater, allowing greater flow rates or "throughput" of filtrate through the filter membrane than previously obtained with the same or less transmembrane pressure.

Figure 2:
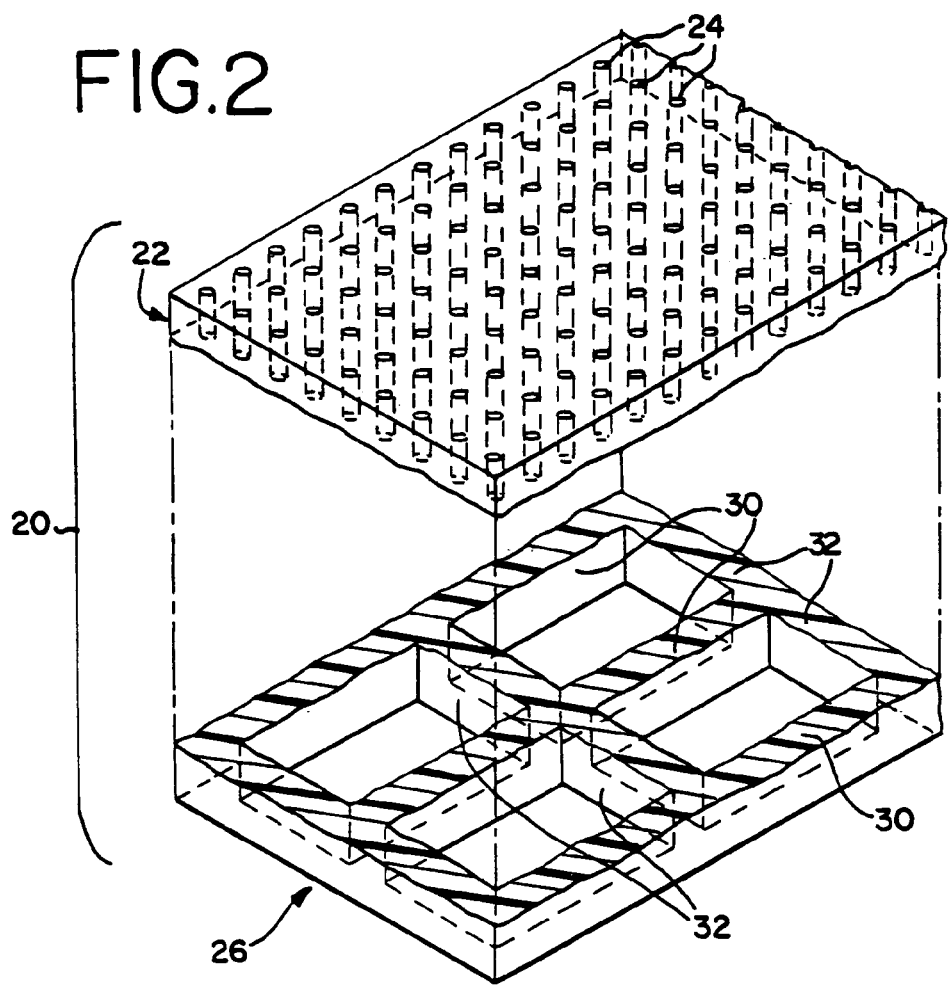
FIG. 2 is a perspective view of the membrane filter of FIG. 1 in which the filter and support layers are separated to show details of the support layer.

The support layer 26 of the filter membrane 20 of FIG. 1 is best seen in FIG. 2, in which the filter and support layers are shown separated. The illustrated support layer 26 includes spaced apart support struts or walls 30 that are parallel and extend in one direction, and support walls or struts 32 that are parallel and extend perpendicular to support walls 30, and intersecting support walls 30 at junctions to define a support grid structure underlying the filter layer. The walls or struts 30 and 32 are preferably spaced apart a distance substantially greater than the cross-sectional dimension of the pores, as can readily be seen in FIGS. 1-8 and to 12. This creates a porous, coarser structure than found in the filter layer, allowing filtrate to readily pass through the support structure. The support struts or walls 30 and 32 are preferably spaced apart between about 50 and 1,000 microns, for a membrane having a filter layer in which the pores have a cross-sectional dimension between about 1 and 20 microns. Although the support structure depicted in FIG. 2 comprises a generally rectangular grid defined by the intersecting support walls or struts 30 and 32, as will be discussed in more detail later, the support structure may have other configurations, and may have more than one layer of differing porosity, spacing, or configuration.

FIGS. 3 and 4 show other aspects of the filter membrane of FIG. 1. FIG. 3 is a top view, looking down on the filter layer and showing the pore layout in this version of the membrane. FIG. 4 is a cross-sectional view of the filter membrane 20. It is apparent from FIG. 4 that the support structure is substantially coarser, with much greater porosity, than the filter layer. As noted above, this allows filtrate passing through the filter layer to pass readily through the support structure without any additional pressure loss or drag.

Figure 5:
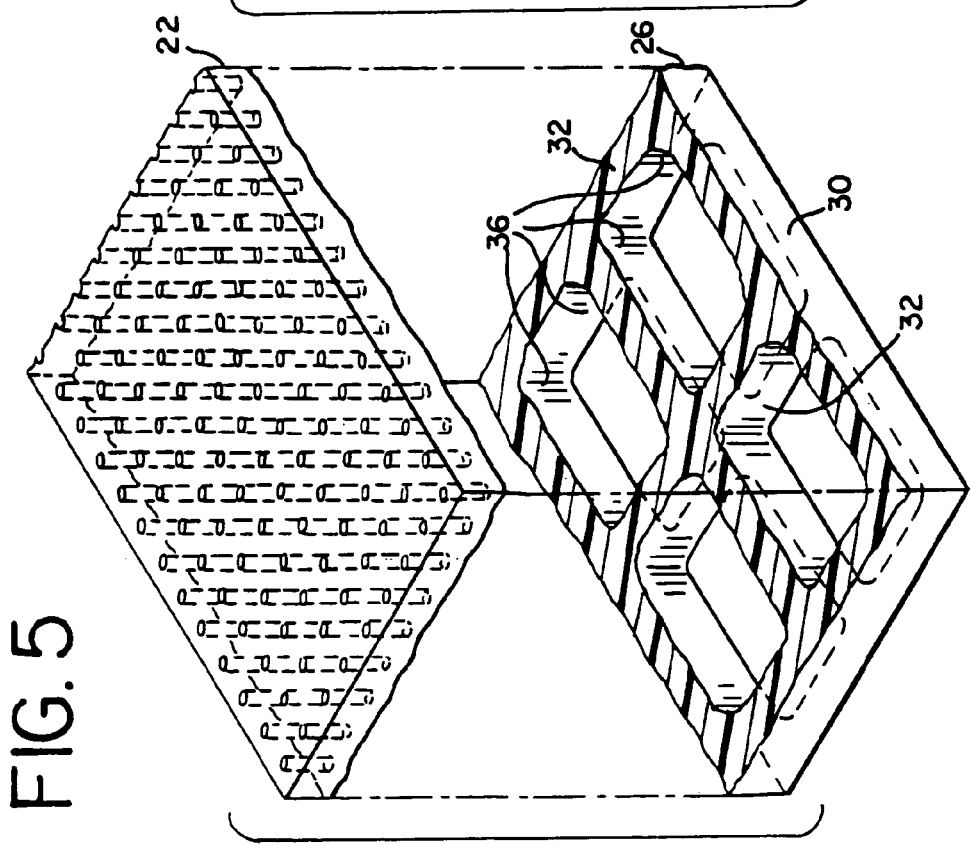
FIG. 5 is a perspective view of an alternative support structure for the membrane of the present invention, with curved intersections of the support walls or struts.

Turning now to FIG. 5, an alternate support structure 34 is shown that is similar to the support structure illustrated in FIG. 2, except that the support walls or struts 30 and 32 are curved (or have fillets) 36 at the junctions where the walls or struts intersect. Although micromachining techniques have advanced significantly over the past decade, it remains very difficult to form surfaces at right angles as illustrated in FIG. 2, and the structure of FIG. 5 should be easier to fashion with micromachining processes. In addition, the use of curves or fillets at intersecting walls or struts also should tend to reduce stress and breakage in those areas when the membrane is flexed.

Figure 6:
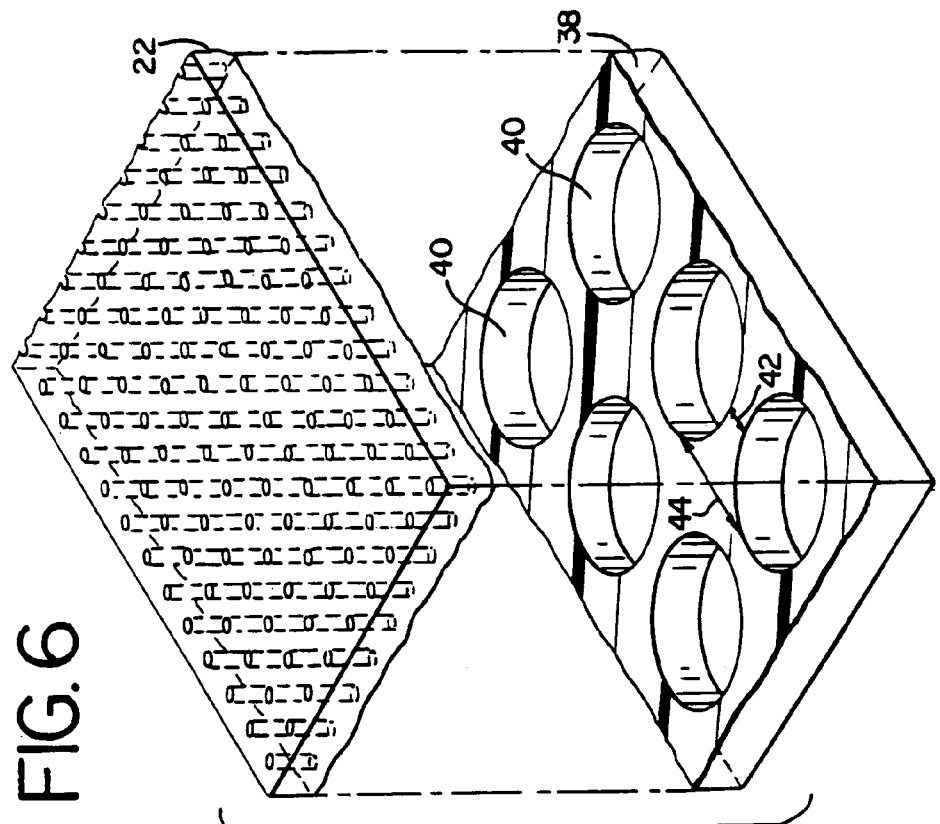
FIG. 6 is a perspective view of another alternate support structure defined by spaced apart cylindrical openings.

FIG. 6 shows yet a further alternative support structure 38 in which the support walls or struts 30 and 32 are defined by circular openings through the support layer, in contrast to the rectangular openings of the FIGS. 2 and 5. This structure may be easier to fabricate than those shown in FIGS. 2 and 5. As result of circular openings, the support walls or struts have a generally thinner waist area 42 and larger end areas 44 where intersecting the other support struts or walls.

The microporous filter membrane illustrated in FIGS. 1-6 has pores that are generally circular in cross-sectional shape. As noted earlier, in accordance with the present invention, the pores do not have the circular cross-sectional shape, and may have different shapes depending on the desired use. FIGS. 8(*a*) and 8(*b*) are top and cross-sectional views, respectively, of an alternative membrane of the present invention in which the pores generally elongated in cross-sectional shape. More specifically, as shown in FIG. 8(*a*), the pores may be rectangular or oval in cross-sectional shape. This shape may provide greater porosity than circular pores, and is also particularly useful in the separation of red cells, platelets and plasma of human blood from white cells.

This particular shape, however, is not new to the present invention. As disclosed in pending U.S. patent application Ser. No. 719,472, previously incorporated by reference, the filter membrane having oval shaped pores of approximately 3 microns by 12 microns may be used to allow the passage of red cells, platelets and plasma while blocking passage of the larger white cells. Other shapes, of course, could be used for filtering different particles, including but not limited to cells, based on the particular shape of the particle, as well as on the size of particle.

As noted above, it is believed that the filter layer of the present invention, due to the monolithic support structure may be made extremely thin, permitting the formation of very small pores, as small as from about 0.08-0.10 microns pore size. For this size pore, the filter layer may be as thin as about 0.3 microns or thereabouts. The support structure shown in FIGS. 1-6 may be suitable for pores of about 1 micron or larger. As the pore size and filter layer thickness become increasingly smaller, other support structure configurations may be required for support of the filter layer.

As pore size becomes much smaller, and the filter layer limited in its thickness, a support layer may be required that is particularly suitable for supporting ultra thin filter layers. For example, the support layer may include two or more sublayers or subgrids of differing porosity, spacing or configuration to better support a very thin filter layer. For example, the support layer may include a subgrid of more closely spaced struts or walls situated between the filter layer and the support grid of the structure shown in FIG. 2.

To provide improved support for the filter layer, particularly for supporting ultra thin filter layers less than about 0.3 microns, the support layer may include two or more sublayers or subgrids 46 and 48 as shown in FIG. 7. As shown there, the support layer has two sublayers in the form of rectangular grids. The first subgrid or sublayer 46 is comparable in configuration to the support structure shown in FIG. 2 and described above. The second sublayer or subgrid 48 is located between the first sublayer 46 and the filter layer 22. The support walls or struts 50 and 52 in the second subgrid are more closely spaced than in the first subgrid to provide additional filter layer support.

The porosity of the different sublayers or subgrids, as well as the configuration of the support structure, the spacing between support walls or struts, and the relative thickness of support walls or struts may be varied according to the application of the particular filter membrane. For example, to provide additional support for the filter layer, the second sublayer may have less porosity than the first sublayer for greater contact with and support of the filter layer. Another alternative is for the second sublayer to comprise a grid having the same or more closely spaced support walls or struts, but with the support walls or struts being thinner and more flexible than in the first sublayer or subgrid, so that greater support is provided, but with the first and second grids having the same porosity. Although illustrated as a support layer having two sublayers or subgrids in FIG. 7, the configuration of the support structure may be varied significantly from that shown in FIG. 7 without departing from the present invention. For example, the support structure may comprise a plurality of support struts that are all parallel, a support grid of different configuration, such as triangular, diamond shaped, circular or other configuration may be selected for ease of manufacture or for the enhanced membrane flexibility or filter layer support, or additional sublayers or subgrids could be provided.

Figure 9:
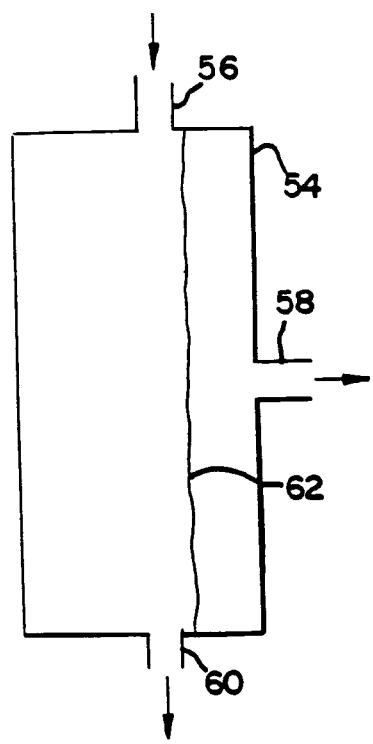
FIG. 9 is a cross-sectional view of a separator embodying the present invention.
Figure 10:
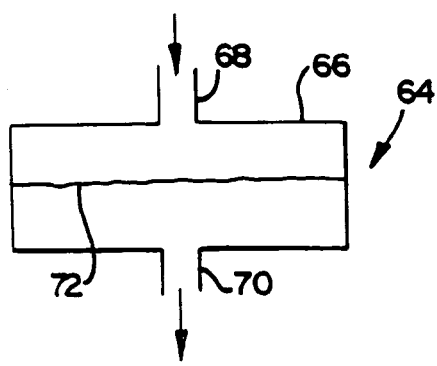
FIG. 10 is a cross-sectional view of another separator embodying the present invention.

The filter membrane of the present invention may be used in a variety of applications. FIGS. 9 and 10 are provided to illustrate schematically at least two different types of filter devices or separators in which a membrane of present invention may be used. These examples are provided simply by way of illustration, and not limitation. The separator or filter apparatus in FIG. 9 includes a housing 54 that may be made of any suitable material, such as rigid plastic or metal. The housing includes an inlet 56, a first outlet 58 and a second outlet 60. A filter membrane 62 in accordance with the present invention is disposed so that fluid being filtered flows across the filter layer of the membrane 62.

Filtrate passing through the filter membrane is removed through the first outlet 58 and the remaining fluid is removed through the second outlet 60. The shear forces of fluid moving across the surface of the membrane should tend to sweep and clear the membrane of clogging particles. The flow path across the membrane may be relatively small in cross-sectional size to cause an increase in flow velocity, enhancing any such sweeping or cleaning action. To further enhance fluid transfer, the transmembrane pressure between the inlet 56 and first outlet 58 may be maintained by appropriate and well-known pumps and pressure control systems to increase the throughput or flow rate of filtrate passing through the filter membrane. Of course, the filter housing may also include a rigid porous support frame or grid to support the membrane.

Another type of filter or separator in which the present membrane may be used is generically shown in FIG. 10. FIG. 10 illustrates a filter device or separator 64 having a housing 66 made of suitable material, with an inlet 68 and outlet 70. A filter membrane 72 in accord with the present invention is provided in the housing in the flow path between the outlet and outlet. As a result of this arrangement, and unlike the separator of FIG. 9, all of the fluid passing through the filter housing must pass through the filter membrane. A filter device or separator such as shown in FIG. 10 may be used, for example, to remove bacteria or certain cells from liquid, or to remove particles greater than a certain size or of a certain shape.

The membrane of the present invention is preferably flexible. The monolithic combination of the filter membrane and the precision-shaped porous support structure provides, as required, both flexibility and robustness that permits the present invention to be used in higher stress filter applications, such as shown in FIG. 11.

Figure 11:
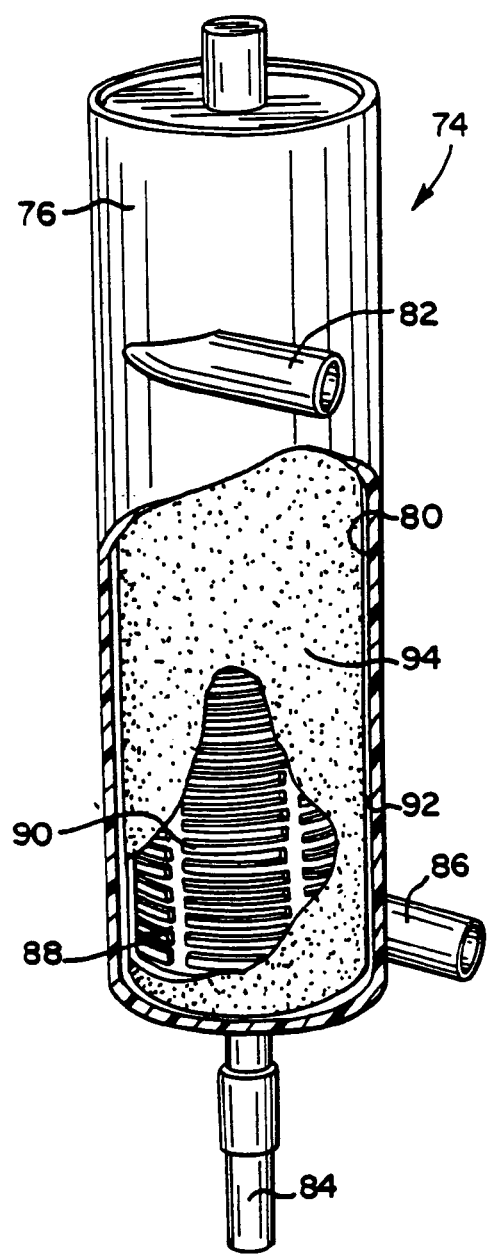
FIG. 11 is a perspective view of spinning membrane type filter embodying the present invention.

FIG. 11 is a perspective view of a spinning membrane type filter device of the type employed in the Autopheresis-C® plasmapheresis device marketed by Baxter Healthcare Corporation. The structure and operation of this separator are set forth in detail in U.S. Pat. No. 5,194,145, previously incorporated by reference, and a detailed description will not be repeated here. Briefly, as depicted in FIG. 11, the filter device or separator 74 includes a housing 76 defining a generally cylindrical inside surface 80. The housing includes a fluid inlet 82, the first outlet 84 and second outlet 86. A rotor 88, with a generally cylindrical outer surface 90, is rotatably mounted in the housing with the outer surface of the rotor spaced from the interior surface of the housing to define a small gap 92 therebetween. The filter membrane 94 of the present invention is mounted on the rotor, with the filter layer facing the gap located between the rotor and housing. The support layer of the filter membrane rests atop a series of spaced-apart support ribs 96 on the surface of the rotor. These raised support ribs support the membrane and form channels to collect filtrate passing through filter membrane.

The flexibility of the membrane of the present invention allows it to be wrapped around the rotor and to conform to the surface of the generally cylindrically shaped rotor. With the membrane construction described in detail above, the membrane embodying the present invention is relatively flexible, and believed to sufficiently flexible to be flexed to radius of curvature of one-half inch. Although the membrane is shown on the surface of the rotor in FIG. 11, alternatively, the membrane could be mounted on the generally cylindrical interior surface of the housing. In that event, the surface of the housing may similarly include raised ribs to support the filter membrane and to collect filtrate passing through the membrane.

In either alternative of the separator shown in FIG. 11, the filter membrane of the present invention is sufficiently robust to withstand the large shear and transmembrane pressures generated in a separator of this type, although the required transmembrane pressure may be significantly lower with the membrane of the present invention due to the reduced filter thickness and the higher porosity.

In the separator shown in FIG. 11, fluid such as a biological suspension or blood is introduced through inlet 82 and flows down through the gap 92 between the outer surface of the rotor 88 and inner surface of the housing 76. During the passage through the gap, the high-speed rotation of rotor generates turbulence in the form of Taylor vortices, which sweep the membrane free of clotting cells or debris. Assisted by substantial transmembrane pressure generated by flow control pumps, plasma from the blood passes through the filter membrane and is collected in the channels defined between the spaced apart raised ribs 90. The plasma flows down through the channels into a collection manifold, and passes through first outlet 84. The remaining portion of the fluid or suspension is withdrawn from the housing through the second outlet 86. In accordance with present invention, the characteristics of high porosity, micron-scale precision shaped pores in the filter layer, and filter membrane robustness hold significant promise for improved performance of the Autopheresis-C® device as well as potential new uses for such a separator.

Figure 12A:
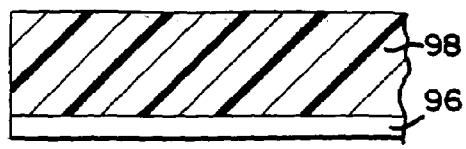
FIGS. 12a-12g illustrate steps of one method for making a membrane of the present invention.

The membrane of the present invention may be made from a variety of materials and one or more different micromachining techniques may be used to form the precision shaped pores or support structure of membrane. FIG. 12 shows the steps involved in one method for making a filter membrane of the present invention in a batch-type process, in which the filter membrane is made on a substrate such as silicon wafer. First, as shown in FIG. 12a, a substrate, such as silicon wafer 96 with a layer of silicon dioxide ($SiO_2$), is provided. This silicon dioxide layer will later be sacrificed to remove the filter membrane created on the wafer.

As depicted in FIG. 12a, a film of photoimageable polyimide polymer 98, which will eventually become the support layer of the filter membrane, is spin coated to a thickness of, for example, about 30 microns, on top of the silicon wafer 96. The polyimide layer is pre-baked or soft-baked to about 200° F. for approximately one minute to partially cure the polyimide layer sufficiently to allow manipulation of it.

Figure 12B:

Referring to FIG. 12b, the polyimide layer is in exposed to deep ultraviolet light 100, through a quartz/chrome mask 101 (which may be formed with well known processes) to define the structure of the support layer. If the polyimide material is positive-acting, the exposed areas are rendered permanent, through cross-linking, as result of light exposure. The areas that not exposed may be removed, as by solvent, at a later point in the process.

Figure 12E:
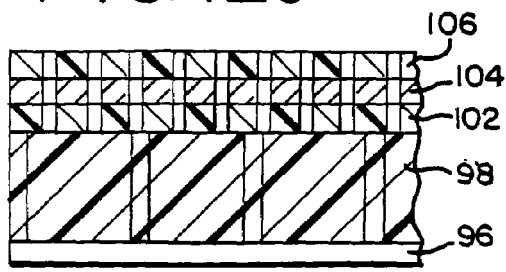
Figure 12C:
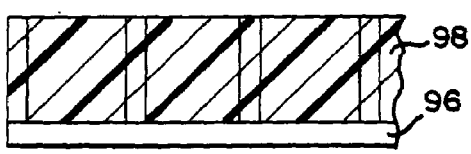

After the support layer is formed, but before the material is removed to define the support structure, another layer of polyimide material 102 is spin coated onto the first layer of material, as shown in FIG. 12C. This layer, which will eventually form the filter layer, is relatively thin. It may typically be 1-3 microns thick, although it may also be as thin as about 0.3 microns. The polyimide material used for this layer is an etchable type of polyimide, and not a photoimageable polyimide. After this second layer of polyimide is formed, it is subjected to a soft bake procedure, as described above, to partially cure the newly added polyimide layer. A thin film of metal 104, such as titanium, is then added to the surface of the thin polyimide layer through a sputtering, evaporation or vapor deposition process. A very thin layer of photoresist material 106, such as one micron thickness, is then spincoated onto the metal layer, and a further softbake procedure carried out.

Figure 12F:
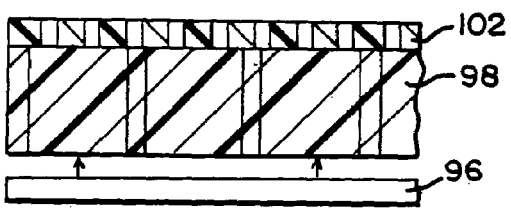
Figure 12D:
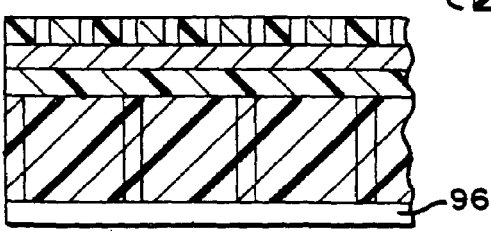

As shown in FIG. 12d, the photoresist layer is then exposed to a deep ultraviolet light through a quartz mask to form a pattern in the photoresist corresponding to the desired pores. Development of the photoresist removes the photoresist material in those areas desired to define a pore structure. The effect of this developing is to expose the metal film in those areas where filter layer material is to be removed to define the filter pores.

Employing an etching procedure, such as reactive ion etching or plasma etching, the exposed portions of the metal layer and the polyimide material therebelow in the thin polyimide layer are sequentially removed to define the pores of the filter layer as depicted in FIG. 12e. The residual photoresist and metal layer may then be removed by solvent or chemical etching, resulting in a two layer preform—the filter layer with precision-shaped micron-scale pores and the support layer, which still does not have the material removed to define a support structure, as shown in FIG. 12f.

Figure 12G:
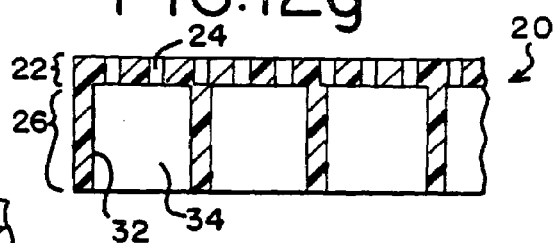

Although the photoimageable layer 98 is sitting on the silicon wafer, access to those areas that have not been cross-linked is available through the pores of the filter layer. By subjecting the preform to an appropriate solvent, the selected material of the support layer may be removed. The remaining polyimide layers are then subjected to a final cure at a full bake temperature such as 400° F. for a period of hours to fully cure the polyimide material. Because the filter and support layers were not previously fully cured and are of compatible polyimide materials, during the curing process the layers chemically bond or cross-link, and the previous line of distinction between the layers disappears, and a monolithic filter membrane is formed as best seen in FIG. 12g. After the baking process, the filter membrane is removed from the wafer by submerging the silicon wafer in a hydrofluoric acid bath, which attacks the silicon dioxide layer and releases the completed filter membrane (See FIG. 12f).

Alternatively, the filter membrane layers could be formed in reverse order, with filter layer first formed on a silicon wafer or other substrate. This process is shown in FIG. 13. A thin layer of etchable polyimide material 108 is spin coated onto the substrate, a silicon wafer 110. This layer of polyimide material will eventually form the filter layer of the filter membrane. After a soft bake, as shown in FIG. 13b, a thin film layer of metal 112, such as titanium, is then formed atop the polyimide layer, and a layer of photoresist material 113 is spin coated onto the metal film. After a soft bake, the photoresist is exposed to deep UV light 114 through a quartz/chrome mask 116 (FIG. 13c) to form a pattern corresponding to the desired pore arrangement. The photoresist is then developed to define the pore pattern, as shown in FIG. 13d. Etching, such as by a reactive ion etching or plasma etching, may be used to transfer the corresponding pattern to the metal layer 112 and to the polyimide layer 108 therebelow (FIG. 13e).

The photoresist and metal layers are then removed from the filter layer, as by solvent, leaving the filter layer atop the silicon wafer (FIG. 13f). As illustrated in FIG. 13g, a thicker layer of photoimageable polyimide material 118 is then spin coated onto the filter layer. This layer will eventually form the support layer of the filter membrane. After a soft bake, the thicker layer is exposed, as shown in FIG. 13h, to deep UV light through a quartz/chrome mask 120 to define the precision-shaped support structure of the filter membrane in the thick polyimide layer. Selected material, depending on whether the photoimageable polyimide layer is positive or negative acting, is then removed, as by solvent, leaving the support structure atop the filter layer on the silicon wafer. The films are then subjected to a hard 400° F. bake to fully cure the films. As a result of a hard bake, the compatible films of polyimide material join to form a monolithic membrane, which may be lifted from the silicon wafer by immersion in an acidic bath, leaving the finished filter membrane as shown in FIG. 13i.

Figure 14:
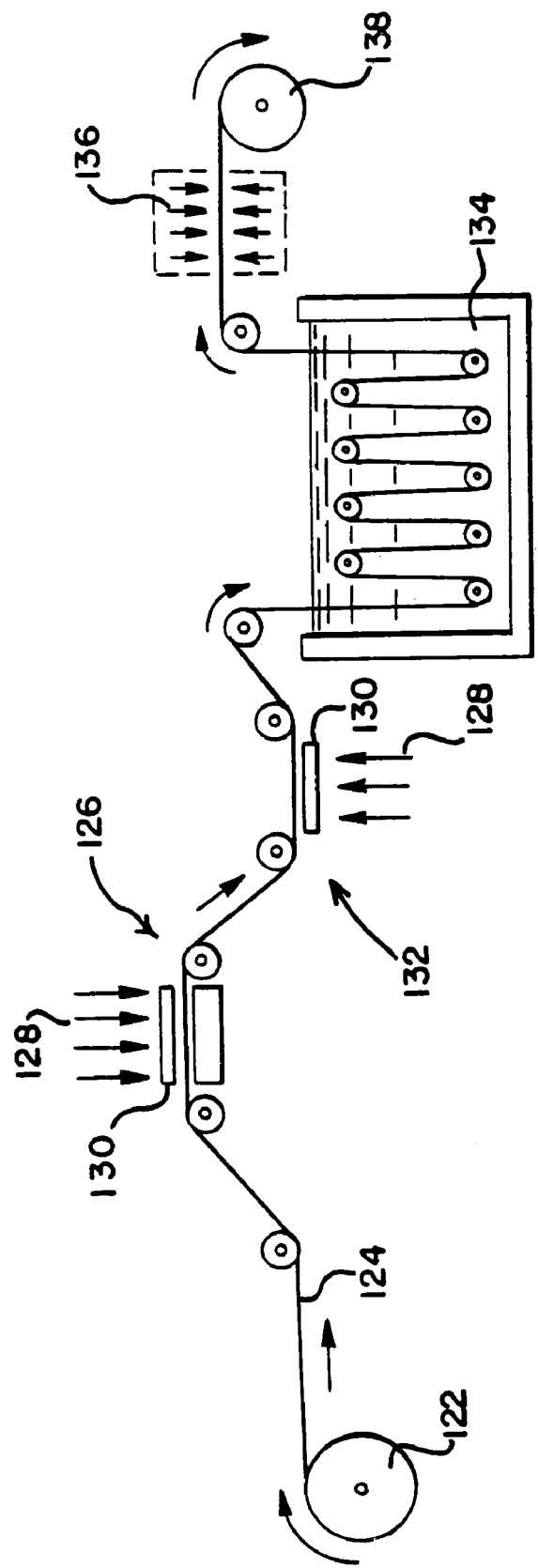
FIG. 14 illustrates a progressive near continuous process for making a membrane of the present invention.

Still another method of making a microporous filter membrane of the present invention is shown in FIG. 14. FIG. 14 shows what is essentially a continuous method for making a microporous filter membrane comprising the present invention. In the method of FIG. 14, a continuous supply of film, such as a photoimageable film, laser ablatable or x-ray treatable film, is provided from a supply reel 122. The film 124 from the supply reel is fed to a first imaging station 126. At the first imaging station, either the filter layer or support layer is formed in one side of the film by one of these processes, such as photoimaging or laser ablation. For example, if the film is photoimageable, one side of the film would be exposed to deep UV light 128 through a mask 130 to define onto the film the particular pattern for the pores or the support structure, whichever is being formed at this station. If a laser ablation process been used, the film is exposed to laser light, such as from an excimer laser, through the mask 130 to ablate material from the film in selected areas to form the pore or support structure. Alternatively, a Synchrotron x-ray source and mask or other suitable micromachining process could be utilized.

The film is then moved or indexed to a second imaging station 132, where a similar process is carried out on the other side of the film to form a pattern for the pores or support structure, whichever is not formed at the first station. As with the first station, the pores or support structure may be formed by laser ablation, x-ray, or a photoimaging process. From the second imaging station, the film passes through a solvent bath 134, which would be required for a photoimaging or x-ray process, but not a laser ablation process, and then through a drying station 136 to the take-up reel 138.

It will be understood that it is not necessary that the same process be used at both imaging stations. For example, laser ablation or x-ray could be used at one station to form the filter layer, while a photoimaging process is used at the other station to form the support structure, or vice versa. The processes used at the imaging stations will, however, require that the film pause at those stations while the imaging or ablation is taking place. Thus, the process shown in FIG. 14 is not continuous in the sense of continuous movement of the film, but it is a progressive stepwise process that continually produces microporous filter membrane incorporating the present invention, unlike the batch processes illustrated in FIGS. 12 and 13.

One further alternative is the use of an embossed or precast film that would have, for example, one side of the film embossed or pre-cast with the courser support structure, where definition is less important. The support structure would presumably be embossed or pre-cast by rollers having a surface of raised and recessed area corresponding to the support structure and formed using known micromachining techniques.

This procedure would eliminate one of the exposure stations 128 in FIG. 14. Only one station would be required to form the pores on the filter layer of the membrane using one of the photoimaging, ablation, x-ray, or other appropriate technique, such as described above.

The filter membrane of the present invention may be made from a variety of different materials. As pointed out above, one material particularly well suited for photoimaging or etching processes is polyimide polymer. These types of polymers are well known and, for example, are available from E.I. Du Pont de Nemours and Company of Wilmington, Del. Riston® material is an example of photoimageable film material available from du Pont in rollstock form, with a thickness of about 37 microns.

The use of laser ablation also opens the door to the use of other materials other than polyimide polymers. For example, polycarbonate, acrylic, nylon, polytetrafluoroethylene, polyurethane, polyester, polypropylene, and polyvinyl chloride.

The following is another specific example of a procedure carried out in making membranes of the present invention, based on use of a silicon wafer, batch process.

1. A standard six inch silicon wafer is provided as the substrate.
2. One micron of thermal oxide is grown in the wafer at 1000° C. in a furnace for approximately 5 hours.
3. Polyimide (OLIN 114A) is spin-cast from a liquid solution onto the oxidized wafer at 3000 r.p.m. to create a film thickness of approximately 2.5 microns.
4. The resultant wafer with applied layers is hot plate baked at 108° C. for 90 seconds in order to firm up the polyimide somewhat.
5. The resultant wafer with applied layers is baked at 200° C. for 1 hour in a Blue M oven; the polyimide is thereby partially cured.
6. A Titanium/Tungsten alloy layer is then applied to the layered structure by a technique such as sputtering, a well-known process in semiconductor and microstructure fabrication where high energy bombarding cause the dislodging and ejection to the gas phase of atoms from pure "targets;" the atoms subsequently travel through the evacuated chamber where they are collected on the surface of the substrate being processed to form a solid layer.
7. Photoresist (Hoechst AZ 5214) is spin coated onto the layered substrate at 3000 r.p.m. to a layer thickness of approximately 0.5 microns.
8. The layered substrate is exposed to light (wavelength of 436 nm) for 12 seconds via an OAI Contact mask aligner/exposion system. Located between the light source and the substrate is a quartz mask that contains a chrome pattern that exhibits the reverse polarity pattern of the desired filter layer geometric pattern. As such, the exposed light cross-links the negative-tone photoresist only in those regions where the light is available to the photoresist. The pattern mask contains solid chrome in those areas where holes would be desired on the filter membrane layer and no chrome where solid material would be desired, namely the areas between holes of the filter layer. The quartz/chrome mask is similar to those routinely used in lithographic processing in the semiconductor and microfabrication industries.

9. The exposed photoresist layer is then developed by 40 seconds of substrate immersion in a solution that is 3:1 by mass of Hoechst AZ 351 development solution to deionized water. The desired membrane pattern is thereby established in the photoresist layer.
10. The substrate and subsequently processed layers are then subjected to a de-ionized water rinse for 5 minutes.
11. The substrate and attached layers are then hot plate baked at 105° C. for 5 minutes to drive off remaining water and further harden the remaining photoresist material by driving off remaining solvent.
12. The pattern developed in the photoresist layer is then faithfully transferred to the titanium/tungsten layer, which is now exposed in those areas where photoresist has been removed in the patterning process. This pattern transfer is done via reactive ion etching (RIE), a well-known process by which a substrate is subjected to a plasma that dissociates a relatively inert gas into reactive species that, assisted by ionic bombardment, etch the desired material. Here, a Plasmatherm 7200 Reactive Ion Etching System was used at 400 Watts and 40 mTorr vacuum with 90 sccm of CF4 and 10 sccm 02.
13. The pattern that had been transferred to the metal layer is now transferred to the polyimide layer, again using RIE via the PlasmaTerm 7200 RIE system at 40 mTor and 400 Watts with 80 sccm of 02 as the etching species. Since this oxygen etch basically removes all exposed organic compounds, the remaining photoresist is also removed during this step.
14. The remaining titanium/tungsten layer is now removed by again utilizing the same RIE step outlined in 12. At this point all that remains is the oxidized wafer and the patterned polyimide that will form the filter membrane layer of the bi-layer composite structure.
15. Negative-acting photoimagable polyimide (OCG 412) is then spincast onto the substrate at 2000 rpm to a thickness of 25 microns.
16. A hotplate bake of 5 minutes at 110° C. is performed.
17. The photoimageable polyimide layer is then exposed to light for 60 seconds through a reverse polarity mask defining the support grid structure/pattern.
18. Immersion develop 5 minutes followed by two 30 second rinses in deionized water.
19. The system is then fully cured in a Blue M oven by ramping the temperature up to 400° C. and holding the temperature at 400 for 30 minutes, and ramping the temperature back down to room temperature. This process fully cures the polyimide from both processing layers and joins the layers to form one monolithic block that is still mounted to the oxidized wafer.
20. The sample is then immersed in a 7:1 buffered oxide etch of 7 parts NH40H (ammonium hydroxide) to one part HF (hydrofluoric acid). The buffered HF solution dissolves the oxide layer on the silicon wafer, releasing the bi-layer membrane filter which floats to the top of the solution.
21. The structure is rinsed in a deionized water bath for several minutes, removed, and rinsed again in a fresh deionized water bath.
22. The structure is allowed to air dry prior to mounting or use.

The suppliers identified in the above process include (1) OAI-Optical Associates Incorporated, 1425 McCandless Drive, Milpitas, Calif.; (2) OCG Microlectronic Materials NV, Keetberglaan 1A, Havennumer 1061 B-2070 Zwijndrecht BE; (3) Olin Microelectronic Materials—42 Kenwood Drive, Woodcliff Lake, N.J.; and (4) Hoechst Celenese Corporation —Fibers and films Division—70 Meister Avenue, Somerville, N.J.

Although the present invention has been described in terms of the preferred and alternative embodiments, this is for purposes of illustration and not for the purpose of limiting the appended claims, which define the scope of the present invention. The words of the claims are intended to be interpreted in accordance with their normal usage, unless specifically defined herein. It is not intended that the words of the claims be limited to those specific features or steps described above that are not expressly called for by the words of the claims. For example, it is not intended that claims requiring a support grid be limited to a rectangular grid of intersecting walls or struts as shown for example in FIGS. 2 and 5. It would be apparent to any one of ordinary skill reading this description that other configurations of grids or grid support structures could be used without departing from the present invention. For these reasons the present invention is defined by the appended claims and not the specific features of this disclosure.

What is claimed is:

1. A method for making a monolithic polymeric filter membrane comprising at least a filter layer including micron-scale precision-shaped pores and a support layer including a precision-shaped support structure for the filter layer, the method comprising:
providing a polymeric film having first and second sides;
forming the filter membrane layer by removing selected material from the first side of the polymeric film to define the precision-shaped micron-scale pores of the filter layer; and
forming the support structure layer by removing selected material from the second side of said polymeric film to define the precision-shaped porous support structure, the pores communicating with the porous support structure to allow the passage of filtrate therethrough, and further comprising
at least one of said filter layer and support layer being formed by:
providing a polymeric film that is of polyimide material
applying a metallic film to one surface of said polyimide film,
applying a photoresist material to said metallic film,
creating a first pattern on said photoresist layer to define micron scale pores or support structure and removing selected material from said photoresist layer;
removing material from said metallic film in the areas where said photoresist material has been removed; and
removing selected material from the polyimide film in the areas where the metallic film has been removed to define the pores or support structure;
removing any remaining photoresist material and the metallic film from the polyimide film.
2. The method of claim 1 in which at least one of said filter layer and said support layer comprises a photoimageable polymeric film and the at least one layer is formed by exposing the film to light through a mask defining a pattern and removing selected portions of said polymeric film defined by pattern to form the pores or support layer.

3. The method of claim 2 in which said polymeric film is a negative-acting photoimagable film and said removing is carried out by removing the non-exposed portions of said film.

4. The method of claim 2 in which said film is a positive-acting photoimagable film and said removing is carried out by removing the exposed portions of said film.

5. The method of claim 1 in which the removing of selected material from the polyimide film is carried out by dry etching.

6. The method of claim 1 in which the support layer is thicker than the filter layer.

7. The method of claim 6 wherein the support layer is thicker than the filter layer by a factor of between about 2 and 250.

8. The method of claim 2 wherein a continuous web of the photoimageable polymeric film is continuously supplied and the pattern is progressively created on said film and selected material is progressively removed to define the pores or support structure.

9. The method of claim 1 in which a continuous web of laser ablatable polymeric film is continuously supplied and selected material is progressively removed to define the pores or support structure.

10. The method of claim 2 in which said photoimageable polymeric film comprises a polyimide.

11. The method of claim 1 in which the support structure comprises a first plurality of spaced apart support struts in which said struts are spaced apart a distance substantially greater than the size of said micron-scale pores.

12. The method of claim 11 in which said support structure comprises a second plurality of spaced apart struts intersecting said first plurality of struts to define a support grid.

13. The method of claim 11 in which said struts are spaced apart a distance in the range of about 50 to 1000 microns.

14. The filter membrane of claim 11 in which the struts are between about 10 and 100 microns in width.

15. The method of claim 1 in which the support structure comprises a grid.

16. The method of claim 1 in which the support structure comprises at least two sublayers, a first sublayer of a selected porosity and a second sublayer of different porosity than the first sublayer and disposed between the first sublayer and the filter layer.

17. The method of claim 15 in which the support grid comprises at least two subgrids, a first subgrid comprising struts of selected width and spaced apart a selected distance and a second subgrid disposed between the first subgrid and the filter layer, the second subgrid including support struts of different width or spacing than the struts in the first subgrid.

18. The method of claim 15 in which the grid comprises a plurality of intersecting walls, said walls being curved at least at the intersections.

19. The method of claim 18 in which the grid comprises a plurality of intersecting walls defined by spaced apart, generally cylindrically or elliptically shaped pores.

20. The method of claim 1 in which the filter membrane is flexible.

21. The method of claim 20 in which the filter membrane is sufficiently flexible to be disposed along a radius of curvature of ½ inch.

22. A method for making a monolithic polymeric filter membrane of a predetermined thickness, the filter membrane comprising at least one filter layer with micron-scale precision-shaped pores and a support layer including a precision-shaped support structure for said filter layer, the method comprising:

providing a substrate;
spinning a first polyimide layer onto the substrate;
applying a metal layer to the first polyimide layer;
applying photoresist to the metal layer;
developing the photoresist to define a first pattern of one of the micron-scale pores or support structure;
transferring the first pattern from said photoresist to said metal layer;
transferring the first pattern from the metal layer to said first polyimide layer so as to create one of said micron-scale pores or said support structure;
sequentially removing the photoresist and the metal layer;
spinning a second polyimide layer onto the first layer polyimide so as to create an interface therebetween;
creating a second pattern on the second polyimide layer to define the other of the micron-scale pores or the support structure;
removing selected material from the second polyimide layer to define the other of the micron-scale pores or support structure;
curing the first and second polyimide layers so as to remove the interface therebetween and create a monolithic filter layer-support structure; and
removing the integral filter layer-support structure from said substrate.

23. The method of claim 22 in which the substrate comprises a silicon wafer.

\* \* \* \* \*